United States Patent
Simmons et al.

[11] Patent Number: 5,906,402
[45] Date of Patent: *May 25, 1999

[54] DUAL SYNCHRONIZED THREAD FLUID CONNECTOR CROSS-REFERENCE TO RELATED APPLICATION

[76] Inventors: John M. Simmons, 605 Slayton; Tom M. Simmons, 504 Slayton, both of Saginaw, Mich. 48603

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/893,587

[22] Filed: Jul. 14, 1997

Related U.S. Application Data

[60] Division of application No. 08/532,220, Sep. 22, 1995, Pat. No. 5,676,406, which is a continuation-in-part of application No. 08/178,909, Jan. 7, 1994, Pat. No. 5,452,748.

[51] Int. Cl.$^6$ .................................................... F16L 15/04
[52] U.S. Cl. ......................... 285/333; 285/354; 285/390
[58] Field of Search .................................. 285/333, 393, 285/390, 392, 357, 354, 386; 411/427, 436, 424, 411; 403/342, 343, 299, 296

[56] References Cited

U.S. PATENT DOCUMENTS

| | | |
|---|---|---|
| 417,393 | 12/1889 | McAllister . |
| 1,372,876 | 3/1921 | Freund . |
| 1,474,905 | 11/1923 | Keszthelyi . |
| 2,019,402 | 10/1935 | Duffy ........................................ 215/43 |
| 2,678,226 | 5/1954 | Wright ...................................... 287/60 |
| 2,977,993 | 4/1961 | Scherer .................................... 138/96 |
| 3,120,570 | 2/1964 | Kennedy .................................. 264/45 |
| 3,308,979 | 3/1967 | Hailes ........................................ 215/9 |
| 3,470,929 | 10/1969 | Thornton ..................................... 150/5 |
| 4,342,337 | 8/1982 | Underwood .......................... 138/96 T |
| 4,564,225 | 1/1986 | Taylor ...................................... 285/333 |
| 4,986,078 | 1/1991 | Laskaris .................................. 62/51.1 |
| 4,997,048 | 3/1991 | Isom .................................... 285/333 X |
| 5,045,826 | 9/1991 | Laskaris ................................. 335/301 |
| 5,452,748 | 9/1995 | Simmons et al. ................... 285/333 X |
| 5,676,406 | 10/1997 | Simmons et al. ....................... 285/333 |

Primary Examiner—Heather Shackelford
Attorney, Agent, or Firm—Prince, Yeates & Geldzahler

[57] ABSTRACT

A screw-threaded connection incorporates multiple synchronized threads, that is, one connection element has a set of external threads that mates with a corresponding set of internal threads on the mating connection element, in customary fashion. The first connection element additionally includes a second set of internal threads synchronized with the first set such that the leads of both sets of threads are the same. This second set of internal threads mates with a corresponding set of external threads on the mating connection element. Of course, the two sets of threads on the mating connection element are synchronized such that their leads are the same, and, of course, the same as first sets of mating multiple synchronized threads. This multiple synchronized thread connection has application to any fluid connector and particularly to fluid connectors in wide-variant temperature deviation, high-pressure, and/or mechanical vibration environments.

12 Claims, 3 Drawing Sheets

DUAL SYNCHRONIZED THREAD FLUID CONNECTOR CROSS-REFERENCE TO RELATED APPLICATION

CROSS-REFERENCE TO RELATED APPLICATION

This application is a Division of U.S. application entitled Multiple Synchronized Thread Fluid Connector, U.S. Ser. No. 08/532,220, filed Sep. 22, 1995, now U.S. Pat. No. 5,676,406 which is a Continuation-In-Part of U.S. application entitled Synchronized Dual Thread Connector, U.S. Ser. No. 08/178,909, filed Jan. 7, 1994, now U.S. Pat. No. 5,452,748, issued Sep. 1995.

BACKGROUND OF THE INVENTION

1. Field of the Invention.

The present invention relates to connectors and other threaded mechanisms, and more particularly, relates to threaded fluid connectors that incorporate mating sets of multiple synchronized threads for effecting the union between the threaded connections.

2. Description of the Prior Art.

It is well known in the prior art to have a tube, pipe or other cylindrical object that incorporates dual threads. That is, a portion of the external surface of the pipe includes external threads, and a portion of the internal surface of the pipe includes internal threads. Such dual-threaded cylindrical devices are typically utilized wherein a cap or cover screws onto the end of the pipe or tube utilizing the external threads, and the internal threads are utilized for providing a screw-adjustment to an internal mechanism where the tube or pipe is connected. An example is a fluid pressure relief valve, wherein the relief pressure is adjustable by turning a threaded plug or the like within the internally threaded tube, the threaded plug engaging a spring and ball mechanism that defines the relief valving mechanism, the screw-adjustment mechanism within the tube being environmentally protected by a cap that screws over the end of the pipe or tube, utilizing the external threads of the pipe or tube. Another example is the valve stem used on vehicle tires and wheels, wherein the internally threaded portion of the cylindrical valve stem is utilized to threadedly receive therein the valve core element which defines the closure mechanism for the valve stem, and the external threads on the end of the cylindrical valve stem receive thereon the plastic or metal cap which is an environmental seal for the valving mechanism within the valve stem.

In these prior art dual thread applications, the internal and external threads function independently of each other, the internal threads serving a function related to the operation of the device itself, and the external threads simply serving as a means to attach a protective environmental cover over the internal mechanism.

In many prior art fluid devices (pumps, valves, motors, etc.), the device includes a cap or cover plate that must effectively seal the inner workings of the device. Such a cap or cover plate generally covers and seals a portion of the device body that needs to be accessible for purposes of manufacture, assembly, adjustment, etc. Many times these caps or plates are made of a different material from that of the device body. In such instances, differences in rates and amounts of material expansion and contraction between the cap or plate and the fluid device body occur because of applications of the fluid device in extremely high or low temperature environments, in high pressure environments, and/or due to water absorption by plastic components. In addition, conventional connector caps or nuts are generally of thinner wall construction than the bodies or mating connectors, and therefore tend to expand as the cap or nut is tightened, because of rotational (diametrical) thrust between the device threads and cap threads. In such instances (threaded caps or plates expanding different amounts and at different rates), thread separation occurs, thereby jeopardizing the fluid/environmental seal between the cap and plate or fluid device body.

OBJECTS OF THE INVENTION

It is an object of the present invention to provide a threaded engagement between two mating pieces that eliminates the problem of thread separation caused by different rates of expansion of dissimilar mating materials.

It is an object of the present invention to provide a threaded engagement between two mating pieces that eliminates the problem of thread separation caused by rotational thrust between the mating threads of the mating pieces.

It is a further object of the present invention to provide a threaded connection that increases the thread strength over the thread length in the mating threaded connectors.

It is a further object of the present invention to provide mating threaded connectors that more effectively maintain their circularity in contact, thereby maximizing actual thread contact between the mating threaded connectors.

It is a still further object of the present invention to provide mating threaded connectors that provide full thread strength in areas where recommended thread depth is not otherwise obtainable.

It is a still further object of the present invention to provide mating threaded connectors that are not susceptible to loosening under vibration as the mating connectors expand and contract due to varying thermal and/or pressure effects, or as a result of tightening.

SUMMARY OF THE INVENTION

A threaded connector comprises two members, each incorporating concentric synchronized dual threads that are adapted to engage mating concentric synchronized dual threads of the mating connector member, such that each mating connector member includes both external threads and internal threads. An alternative embodiment threaded connector comprises two members, each incorporating sets of concentric multiple synchronized threads that are adapted to engage mating sets of concentric multiple synchronized threads of the mating connector member, such that each mating connector member includes at least one set each of both external threads and internal threads.

DETAILED DESCRIPTION OF THE INVENTION

Figure 1:
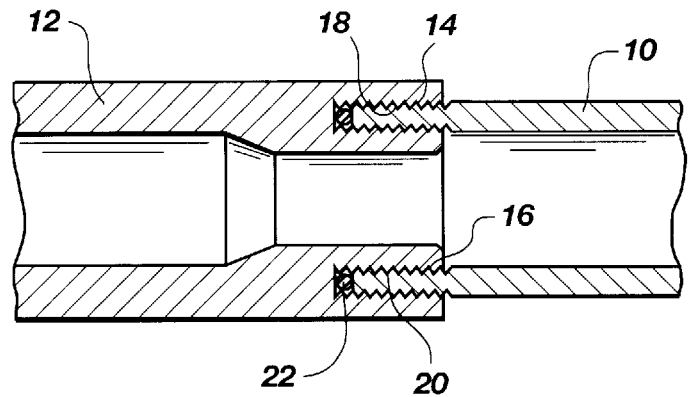
FIG. 1 is a sectional view taken through a simple pipe sleeve connection embodying the synchronized dual thread connectors of the present invention.

Turning now to the drawings, and initially to FIG. 1, the concept of the present invention is shown in its most simplistic form, that being a threaded connection between two pipes or other fluid conduits, one of them having an area of increased wall thickness in order to accommodate and accept the threaded end of the other. FIG. 1 is a sectional view through the threaded connectors, and illustrates a first threaded connector 10 on the right and the mating threaded connector 12 on the left. As shown, the first connector 10 is formed with a set of external threads 14 on the end thereof in a customary manner for a threaded pipe. In addition, the first connector 10 includes a set of internal threads 16 on the internal surface of the connector, also in a customary fashion. In accordance with the present invention, these internal and external threads 14 and 16, respectively, are synchronized, such that rotating the first connector 10 in the right hand (clockwise) direction enables the internal threads to travel along and engage mating threads on the mating threaded connector 12. In this regard, the mating connector 12 includes a set of internal threads 18 that engage corresponding external threads 14 of the first connector, and mating external threads 20 that engage corresponding internal threads 16 of the first connector. Of course, these corresponding internal and external threads 18 and 20, respectively, of the mating threaded connector 12 are also synchronized with each other so that they mate with and engage the synchronized external threads 14 and internal threads 16, respectively, of the first threaded connector 10 as the two threaded connectors are screw-threaded together.

In the embodiment shown in FIG. 1, all of the thread sets 14, 16, 18 and 20 are straight threads, as opposed to tapered pipe threads. Straight threads are not designed to serve as fluid seals between the two mating threaded pieces. Therefore, the embodiment of FIG. 1 includes an O-ring 22 in the bottom of the annular channel defined by the second connector synchronized internal threads 18 and external threads 20, for providing the fluid seal between the first and second threaded connectors 10, 12. Of course, the thread sets 14, 16, 18 and 20 can be tapered pipe threads, which are designed to effect a fluid seal therebetween, thereby obviating the necessity for the O-ring fluid seal. Also, of course, the fluid seal can be effected by sealing means other than O-rings, i.e., by any fluid seal design or type that is typical for the particular industry in which a synchronized dual thread connector of the present invention is utilized.

Figure 2:
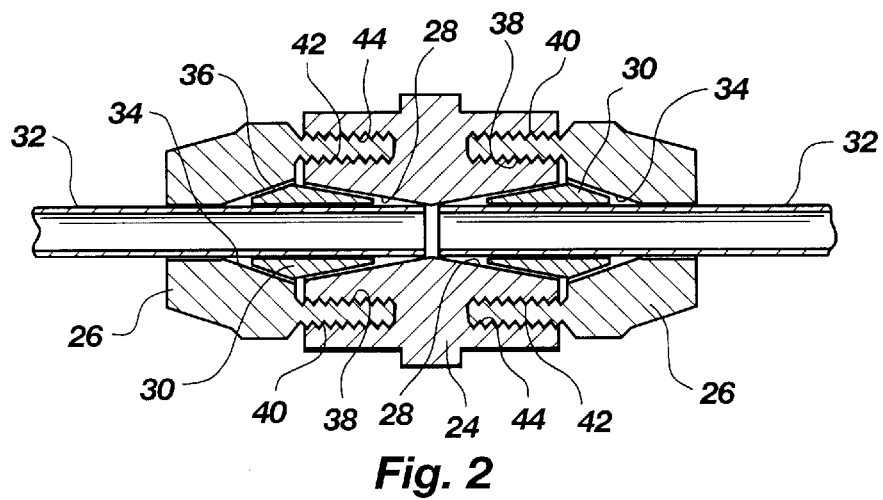
FIG. 2 is a sectional view taken through an in-line union fluid connector that utilizes the synchronized dual threads of the present invention, in a ferrule-type connector.

FIG. 2 is a sectional view taken through an in-line union ferrule-type fluid connector that utilizes the synchronized dual threads of the present invention. As shown, the connector of this embodiment comprises a union 24 and two nuts that are identical, and therefore will be designated by the same reference numeral 26. The union 24 includes identical and opposed frustoconical tapered surfaces 28 that engage respective tapered ferrules 30 positioned around identical ends of conduits or tubing 32 to be connected together in a fluid seal. Each nut 26 also includes a frustoconical tapered surface 34 for engaging the opposite tapered surface 36 of the ferrule 30. The workings of the union connector of FIG. 2 are customary and standard in the fluid industry.

Each nut 26 includes, in addition to the customary internal threads 38, a set of external threads 40 that are, of course, synchronized with the internal threads 38. These respective internal threads 38 and external threads 40 of the nut engage respective synchronized external threads 42 and internal threads 44 of the union 24. As is customary, these union connector threads 38, 40, 42, and 44 are straight threads, as opposed to tapered or pipe threads, and therefore do not effect a fluid seal. Rather, as is customary, the fluid seal of the connector of FIG. 2 is effected by the tapered ferrules 30 and their engagements with respective frustoconical tapered surfaces 28 of the union and 34 of the nut, and the ferrules' engagement with the fluid conduits 32.

In accordance with the concept of the present invention, the union 24 and nuts 26 incorporate synchronized dual thread connections in order to effect one or more of the objects of the present invention, as applied to ferrule-type fluid connectors. Specifically, the synchronized dual threads of the FIG. 2 connector maintain the circularity of both mating pieces and of the ferrule and fluid conduit. Synchronized dual threads also eliminate the possibility of the connector threads' separating due to dissimilar rates of expansion of the union and nuts constructed of dissimilar materials, and due to expansion of the conventional connector nut that has no outer portion of the union body to prevent such expansion.

Figure 3:
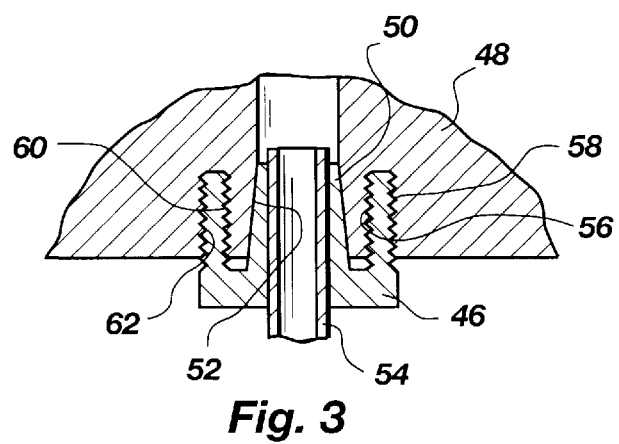
FIG. 3 is a sectional view taken through a synchronized dual thread ferrule connector nut that screws into the body of a fluid device, the ferrule being formed with the nut.

FIG. 3 is a sectional view taken through an alternative ferrule-type fluid connector that utilizes the synchronized dual threads of the present invention, the ferrule being formed as part of the nut. As shown, the connector of FIG. 3 includes a nut 46 that is adapted to threadedly engage the body of a fluid device 48, as in a pump, valve, motor, etc. The nut 46 has incorporated therewith a tapered ferrule 50 that is adapted to engage a mating frustoconical tapered surface 52 of the body of the fluid device in the customary manner to compress the ferrule down around a fluid conduit 54 as the nut is screwed into the body of the fluid device.

The nut 46 includes, in addition to the customary internal threads 56, a set of synchronized external threads 58 that engage respective synchronized external threads 60 and internal threads 62 formed with the body of the fluid device. The nut 46 of FIG. 3 functions in an identical manner to that of the nut 24 of the FIG. 2 connector to compress the tapered ferrule 50 down against the fluid conduit 54 in the customary manner as the nut is screwed into the fluid device 48. Again, the synchronized dual threads of the present invention incorporated into the connector of FIG. 3 effect the same objects in maintaining the fluid seal between the fluid device and conduit as in the previously described fluid connectors.

Figure 4:
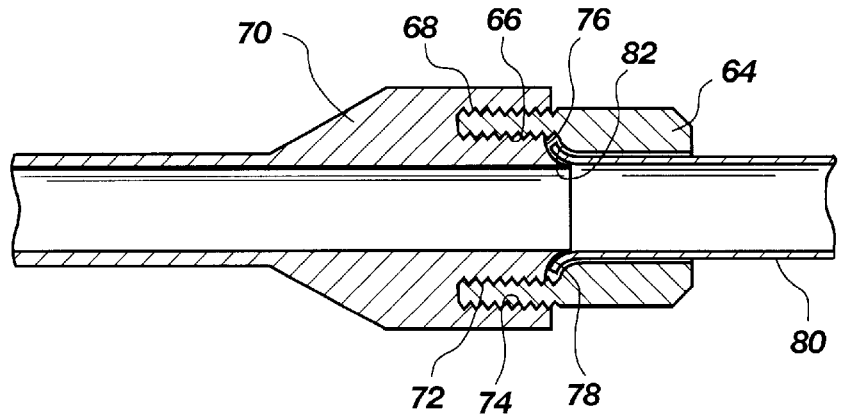
FIG. 4 is a sectional view taken through an in-line synchronized dual thread connector for use with a flared fluid conduit.

FIG. 4 is a sectional view taken through an in-line synchronized dual thread connector for use with a flared end fluid conduit. The connector of the embodiment of FIG. 4 comprises a nut 64 which is formed with a set of internal threads 66 in a customary manner for a flared end conduit connector nut. In addition, the nut 64 includes a set of external threads 68 on the external surface thereof which are synchronized with the internal threads 66, as has been previously described. The nut 64 is adapted to threadedly engage and be received into a mating connector 70. This mating connector 70 includes a set of external threads 72 that engage corresponding internal threads 66 of the nut, and a set of synchronized internal threads 74 that engage corresponding external threads 68 of the nut.

The mating connector 70 includes an inner tapered annular surface 76 that is adapted to engage and seal against a mating flared surface 78 of the fluid conduit 80. In this regard, the nut 64 also includes an inner tapered annular surface 82 that mates with the backside of the conduit flared surface 78 and urges the flared surface in fluid sealing relationship against the inner tapered annular surface 76 of the mating connector piece 70 in the convention manner to effect the fluid seal therebetween. The operation of the flared-type fluid connector of FIG. 4 is customary and standard in the fluid industry.

In accordance with the concept of the present invention, the flared fluid conduit nut 64 and mating connector 70 incorporate synchronized dual thread connections in order to effect one or more of the objects of the present invention, as applied to flared end conduit fluid connections. Specifically, the synchronized dual threads of the connector of FIG. 4 maintain the circularity of both mating pieces, the nut and mating connector, and specifically of the conduit flared surface 78 and the inner tapered annular surface 76 of the connector 70 to maintain a tight fluid seal therebetween, and also eliminate the possibility of the connector threads' separating due to dissimilar rates of expansion of the nut and its mating connector constructed of dissimilar materials.

Figure 5:
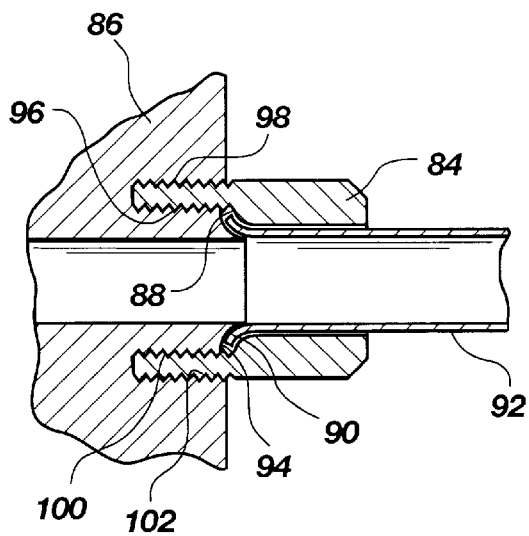
FIG. 5 is a sectional view through a flare-type synchronized dual thread connector, wherein the connector nut engages a portion of the body of a fluid device.

FIG. 5 is a sectional view through a flare-type synchronized dual thread connector, wherein the connector nut 84 is adapted to threadedly engage the body of a fluid device 86 as in a pump, valve, motor, etc. The nut 84 has incorporated therewith an inner tapered annular surface 88 that engages the backside of a flared end 90 of a fluid conduit 92 in the customary manner to urge the conduit flared end against a mating inner tapered annular surface 94 of the fluid device body 86 in order to effect a fluid seal therebetween. The nut 84 includes, in addition to the customary internal threads 96, a set of synchronized external threads 98 that engage respective synchronized external threads 100 and internal threads 102 formed with the body of the fluid device.

The nut 84 of FIG. 5 functions in an identical manner to that of the nut 64 of the FIG. 4 connector to urge the conduit flared end 90 against the fluid device body inner tapered annular surface 94 in the customary manner to effect the fluid seal therebetween as the nut is screwed into the fluid device 86. Again, the synchronized dual threads of the present invention incorporated into the connector of FIG. 5 effect the same objects in maintaining the fluid seal between the fluid device and conduit as in the previously described fluid connectors.

Figure 6:
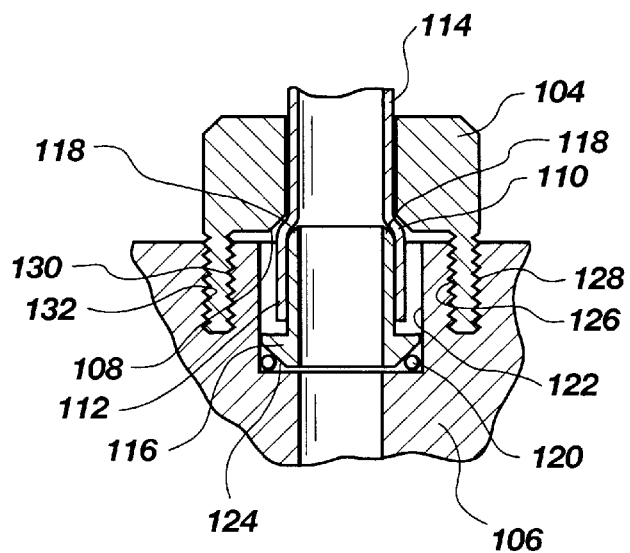
FIG. 6 is a sectional view similar to FIG. 5, illustrating a different type of fluid conduit flared connection.

FIG. 6 is a sectional view similar to FIG. 5, illustrating a different type of fluid conduit flared end connector. The connector of FIG. 6 includes a nut 104 that is adapted to threadedly engage the body of a fluid device 106, as in a pump, valve, motor, etc. The nut 104 has incorporated therewith an inner tapered annular surface 108 that is adapted to urge against an annular transition area 110 of an enlarged end 112 of a fluid conduit 114.

The fluid connector of FIG. 6 includes a ferrule sleeve 116 that functions similarly to the inner tapered annular surface 76 of the connector of FIG. 4 and inner tapered annular surface 94 of the fluid device body of FIG. 5 to form a fluid seal between the ferrule sleeve and the conduit 114. In this embodiment, the inner annular tapered surface 108 of the nut urges the annular transition area 110 of the conduit against a mating second annular tapered surface 118 of the ferrule sleeve in order to effect a fluid seal therebetween. The fluid seal between the ferrule sleeve 116 and the body of the fluid device 106 is effected by an O-ring seal 120 positioned in an annular channel defined by the bottom of the fluid device body borehole 122 and a tapered annular surface 124 of the ferrule sleeve 116.

The nut 104 in the FIG. 6 embodiment includes, in addition to the customary internal threads 126, a set of synchronized external threads 128 that engage respective synchronized external threads 130 and internal threads 132 formed with the body of the fluid device 106. The nut 104 of FIG. 6 functions in an identical manner to that of the nut 84 of the FIG. 5 connector to compress the conduit annular transition area 110 down against the tapered annular surface 118 of the ferrule sleeve 116 to effect a fluid seal therebetween in the customary manner as the nut is screwed into the fluid device. In addition, tightening the nut 104 down against the fluid conduit and ferrule sleeve also effects the fluid seal provided by the O-ring 120. Again, the synchronized dual threads of the present invention incorporated into the connector of FIG. 6 effect the same objects in maintaining the fluid seal between the fluid device and conduit as in the previously described fluid connectors.

Figure 7:
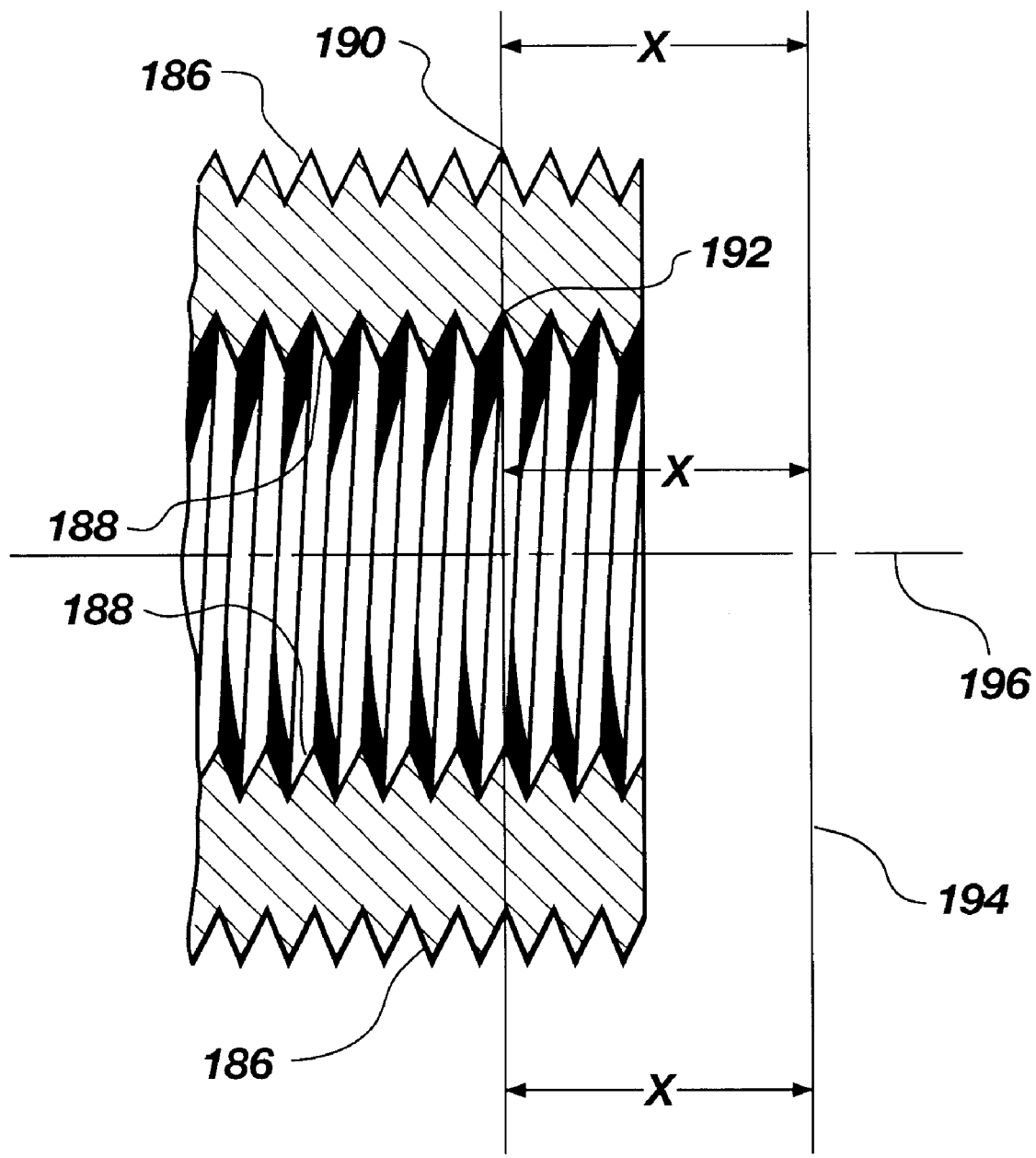
FIG. 7 is a sectional view through a portion of one connector incorporating the synchronized dual threads, illustrating the location of the starting points for both sets of threads relative to each other, in order to maximize the amount of material between the sets of threads.

FIG. 7 is a sectional view through a portion of one connector incorporating the synchronized dual threads of the present invention, illustrating the location of the starting points for both sets of threads relative to each other, in order to maximize the amount of material between the sets of threads. The connector has a set of external threads 186 and synchronized internal threads 188. The respective starting points of the threads are such that the crest 190 of the external threads 186 and a corresponding root 192 of the internal threads are always co-planar. Stated differently, the crest 190 and root 192 are always equidistant (X) from a plane 194 that is normal to the axis 196 of the threads. In this manner, the maximum amount of connector material is always between the external and internal threads, thereby maximizing the structural integrity of the connector itself, and of both sets of synchronized threads.

Those skilled in the art will readily appreciate that it will be virtually impossible to cross-thread a connector or closure member utilizing the synchronized dual thread design, if both sets of synchronized threads begin within the same plane and at the same rotational angle. This is because, with both sets of threads starting at precisely the identical location, each set will urge the other set into precise thread engagement, rather than into a potential cross-thread start. Additionally, attempting to cross-thread synchronized dual threads would be met with a force of resistance that is synergistic to that of the added resistance forces of attempting to cross-thread two single thread connectors.

What is claimed is:

1. A threaded fluid connector for a fluid conduit, the connector comprising:

a nut for positioning around the fluid conduit adjacent an end of the conduit, the nut having a set of straight, non-tapered external threads and a set of straight, non-tapered internal threads synchronized with the external threads: and a mating threaded member having a fluid passageway therethrough, and having a set of internal threads adapted to mate with the nut set of external threads, and a set of external threads adapted to mate with the nut set of internal threads, the mating threaded member set of external threads being synchronized with the mating threaded member set of internal threads.

2. A threaded fluid connector as set forth in claim 1, wherein the external and internal threads are oriented in a manner to maximize the amount of material between the external and internal threads.

3. A threaded fluid connector as set forth in claim 1, further comprising sealing means for fluidly sealing between the fluid conduit and the mating threaded member fluid passageway.

4. A threaded fluid connector as set forth in claim 1, wherein the nut further includes an annular beveled surface that cooperates with a mating annular beveled surface formed with the mating threaded fluid connector member adjacent the fluid passageway for sealing against a flared end of a fluid conduit within the nut.

5. A threaded fluid connector as set forth in claim 1, wherein the sealing means comprises a ferrule positioned around the fluid conduit and within the nut, the nut includes an annular beveled surface that seals against the ferrule adjacent one end thereof, and the mating threaded fluid connector member includes an annular beveled surface that seals against the ferrule adjacent the opposite end thereof.

6. A threaded fluid connector as set forth in claim 1, wherein the nut further includes an annular flange positioned around the fluid conduit, the annular flange having a tapered outer surface that seals against a mating tapered inner annular surface formed with the mating threaded fluid connector member fluid passageway.

7. A threaded fluid connector for a fluid conduit, the connector comprising:

a nut for positioning around the fluid conduit adjacent an end thereof, the nut defining a first annular flange having: a set of straight non-tapered external threads and a set of straight non-tapered internal threads, the nut set of external threads being synchronized with the nut set of internal threads: and a mating threaded member having a fluid passageway therethrough and defining an annular channel having:

a set of internal threads adapted to mate with the nut set of external threads, and a set of external threads adapted to mate with the nut set of internal threads, the mating threaded member internal threads being synchronized with the mating threaded member external threads.

8. A threaded fluid connector as set forth in claim 7, wherein the external and internal threads are oriented in a manner to maximize the amount of material between the external and internal threads.

9. A threaded fluid connector as set forth in claim 7, further comprising sealing means for fluidly sealing between the fluid conduit and the mating threaded member fluid passageway.

10. A threaded fluid connector as set forth in claim 7, wherein the nut further includes an annular beveled surface that cooperates with a mating annular beveled surface formed with the mating threaded fluid connector member adjacent the fluid passageway for sealing against a flared end of a fluid conduit within the nut.

11. A threaded fluid connector as set forth in claim 7, wherein the sealing means comprises a ferrule positioned around the fluid conduit and within the nut, the nut includes an annular beveled surface that seals against the ferrule adjacent one end thereof, and the mating threaded fluid connector member includes an annular beveled surface that seals against the ferrule adjacent the opposite end thereof.

12. A threaded fluid connector as set forth in claim 7, wherein the nut further includes a second annular flange positioned around the fluid conduit, the second annular flange having a tapered outer surface that seals against a mating tapered inner annular surface formed with the mating threaded fluid connector member fluid passageway.

* * * * *